Oct. 30, 1923.
R. A. JONES
1,472,364
CARTON FOLDING AND FILLING MACHINE
Filed June 8, 1920    9 Sheets-Sheet 1
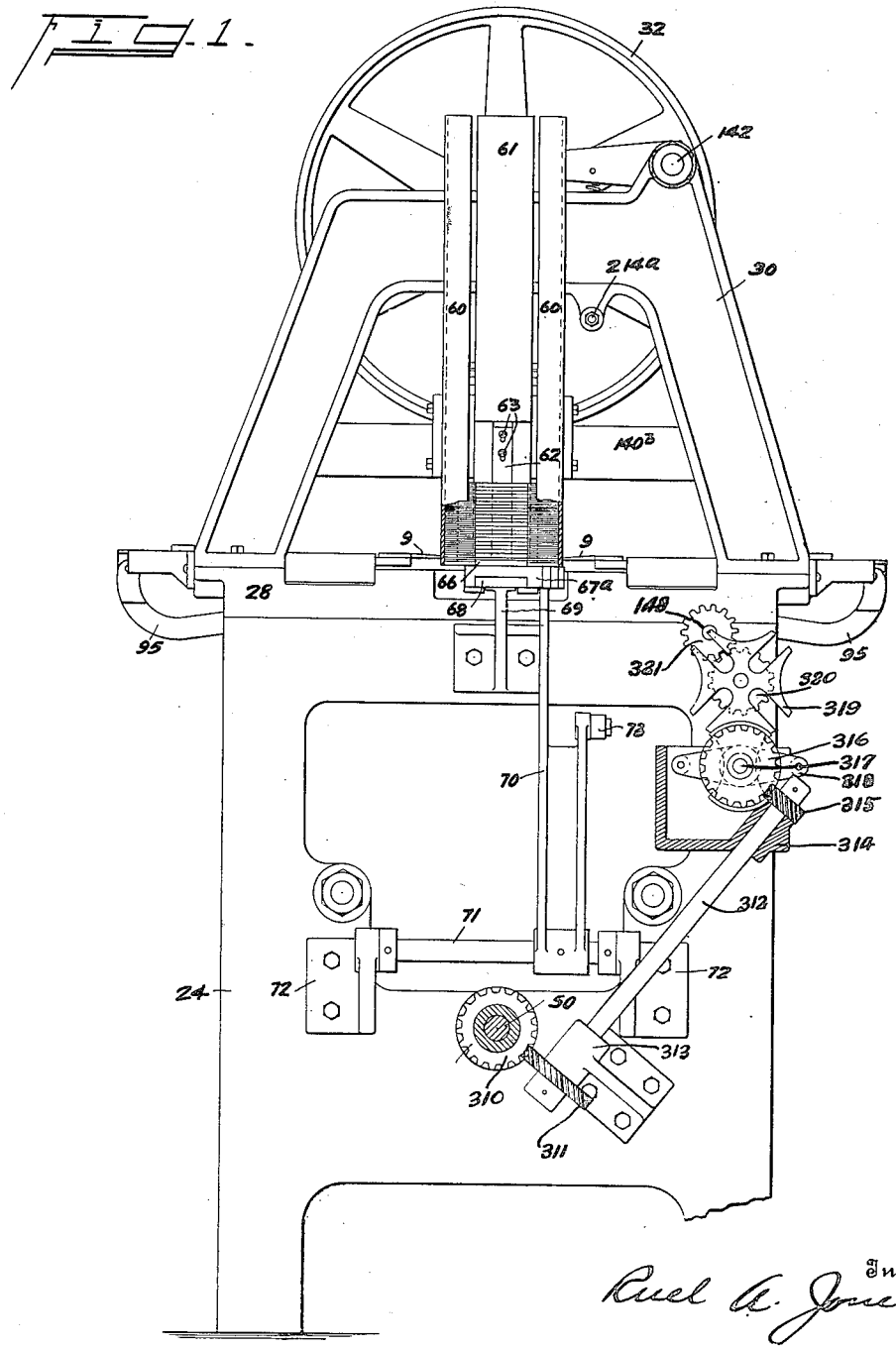

Oct. 30, 1923.
R. A. JONES
CARTON FOLDING AND FILLING MACHINE
Filed June 8, 1920     9 Sheets-Sheet 2
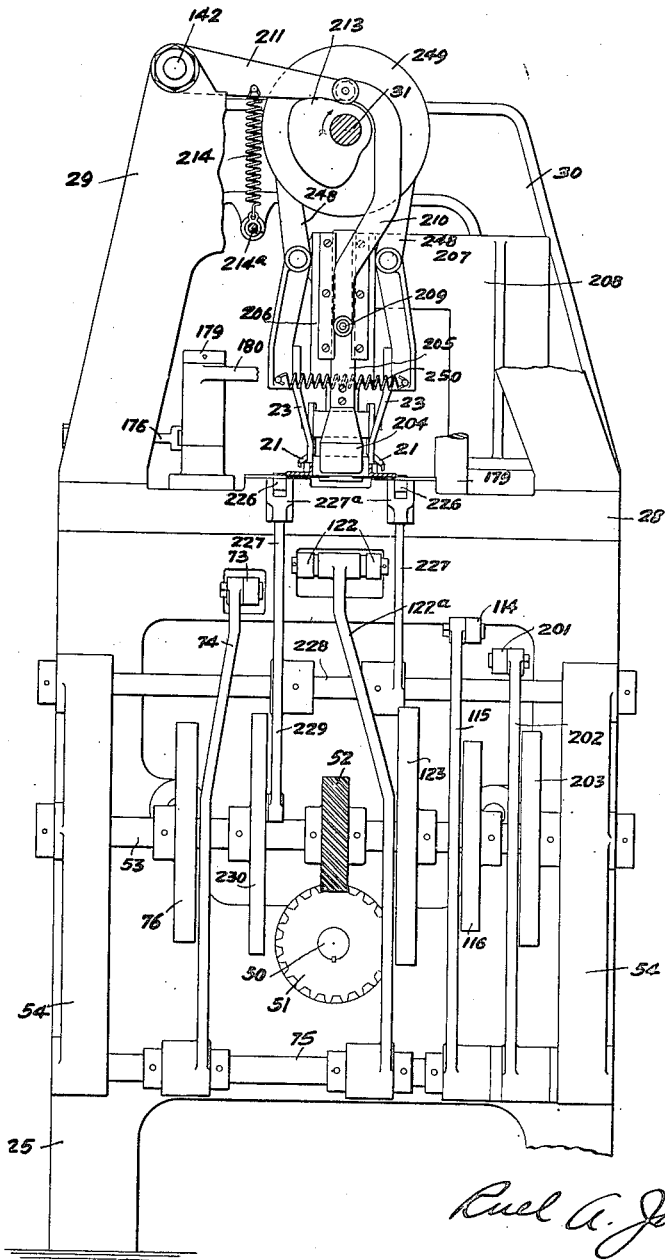
Inventor:
Ruel A. Jones
By Wood & Wood
Attorneys

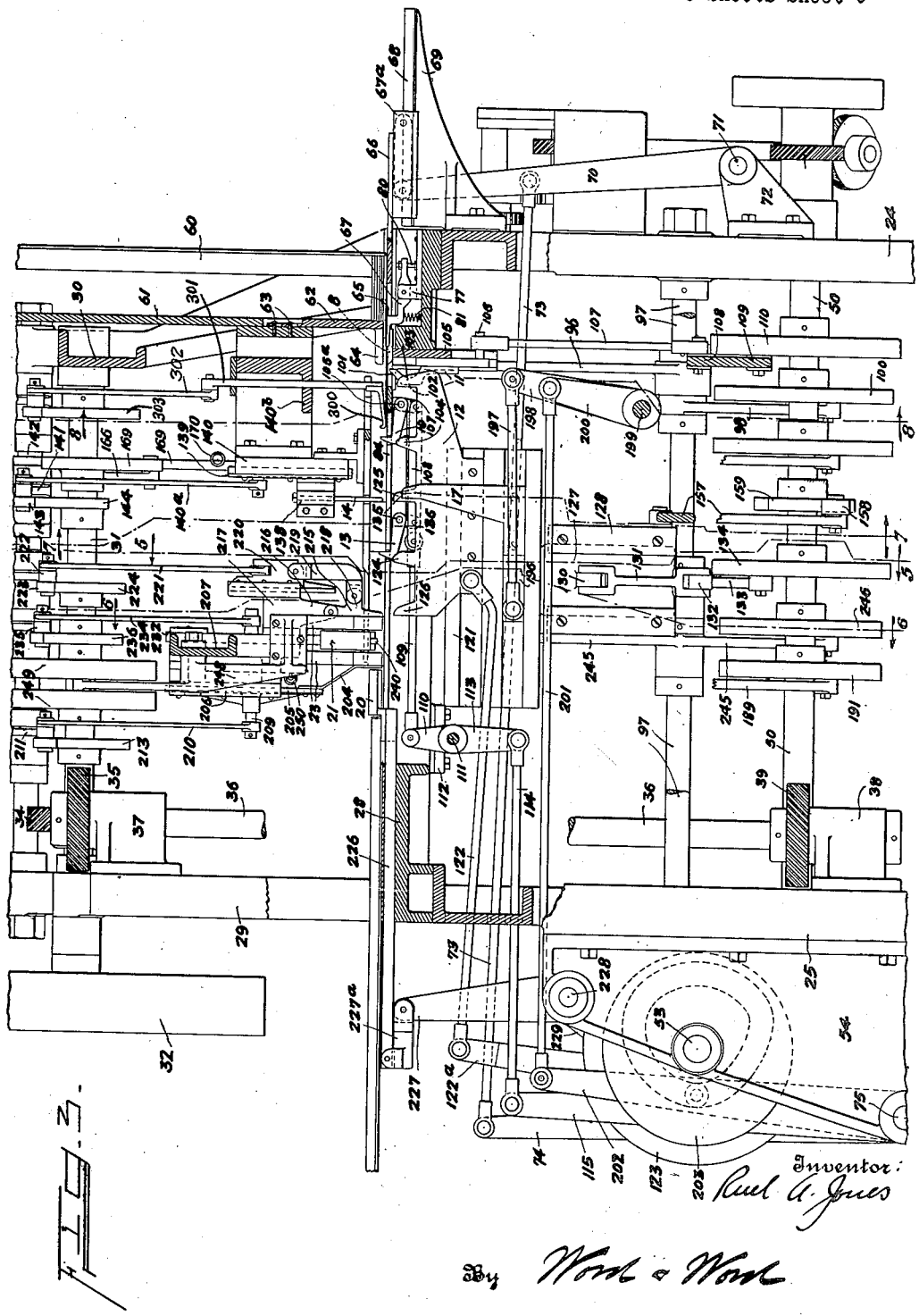

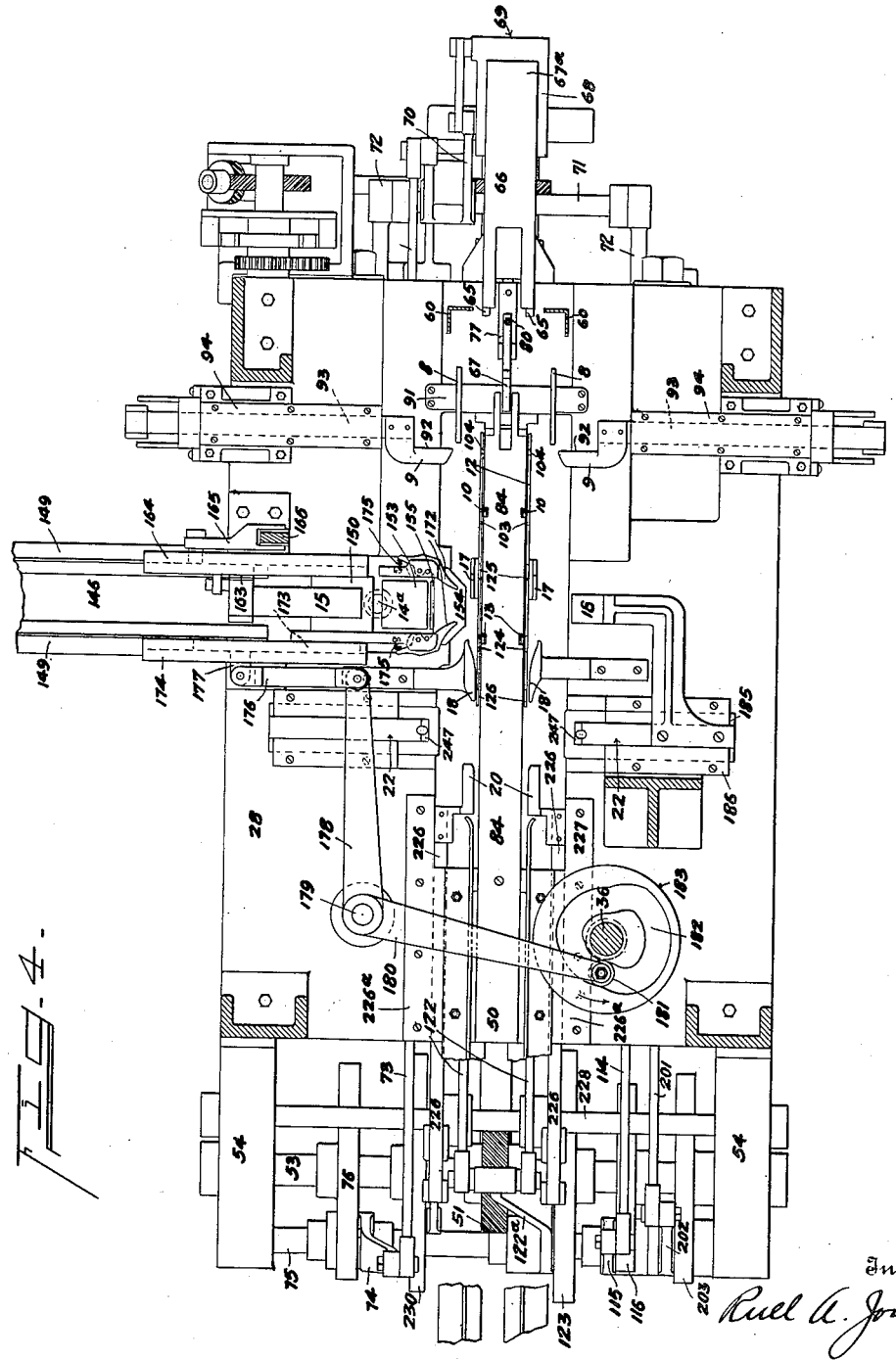

Oct. 30, 1923.

R. A. JONES 1,472,364

CARTON FOLDING AND FILLING MACHINE

Filed June 8, 1920    9 Sheets-Sheet 5

Inventor:
Ruel A. Jones
By Wood & Wood
Attorneys

Oct. 30, 1923.

R. A. JONES 1,472,364

CARTON FOLDING AND FILLING MACHINE

Filed June 8, 1920       9 Sheets-Sheet 7

Oct. 30, 1923.
R. A. JONES
CARTON FOLDING AND FILLING MACHINE
Filed June 8, 1920  9 Sheets-Sheet 9
1,472,364
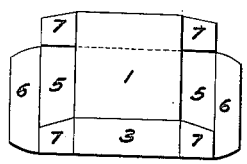
Fig. 9.
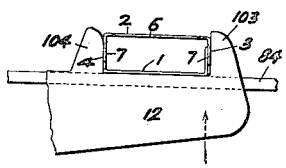
Fig. 14.
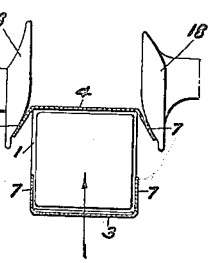
Fig. 19.
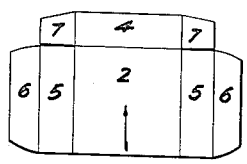
Fig. 10.
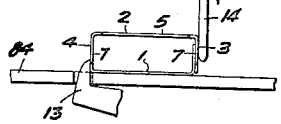
Fig. 15.
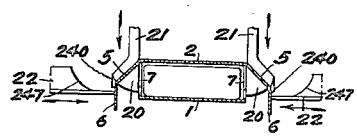
Fig. 20.
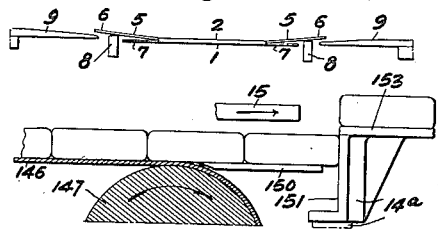
Fig. 11.
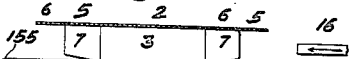
Fig. 16.
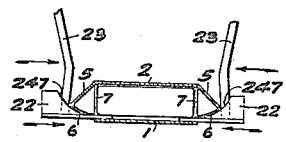
Fig. 21.
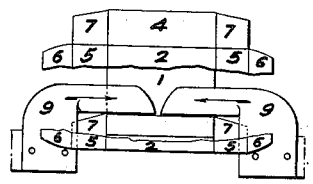
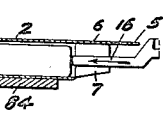
Fig. 12.
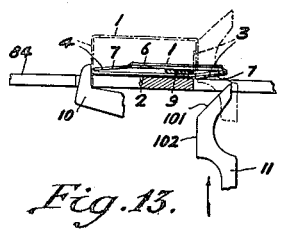
Fig. 13.
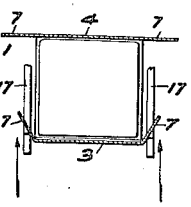
Fig. 18.
Inventor:
Ruel A. Jones
By Wood & Wood
Attorneys Patented Oct. 30, 1923.

1,472,364

UNITED STATES PATENT OFFICE.

RUEL A. JONES, OF COVINGTON, KENTUCKY, ASSIGNOR TO R. A. JONES AND COMPANY, INCORPORATED, OF COVINGTON, KENTUCKY, A CORPORATION OF KENTUCKY.

CARTON FOLDING AND FILLING MACHINE.

Application filed June 8, 1920. Serial No. 387,489.

*To all whom it may concern:*

Be it known that I, RUEL A. JONES, a citizen of the United States, and residing at Covington, in the county of Kenton and State of Kentucky, have invented a new and useful Improvement in Carton Folding and Filling Machines, of which the following specification is a full disclosure.

My invention relates to improvements in carton filling machines, and one of the objects of the invention is to provide a machine of this character, which will operate upon a commercial foldable carton marketed in a collapsed or knock-down state, for ejecting the cartons successively one by one from a stack or pile loading within the magazine of the machine, opening the successively delivered cartons, filling the opened cartons with articles of merchandise and closing the end closure flaps of the filled cartons. The various manipulative steps following successively in an orderly manner progressively at stations or stages to which the carton is advanced in its translation through the machine, whereby a plurality of cartons in progression are operated upon at the same time for a more continuous carton delivery and advance directed to increasing the capacity of the machine.

Other objects of the invention may be directed to the various features of advantage and detail of construction of improved mechanism for performing the various operations, as expelling and delivering the cartons from a stack or pile within a magazine or holder, raising the tucking closure flaps for the insertion of blades to insure the seperation of the folded sides, and provide an edge along the scored line of the carton to open the carton by a pressure imparted transversely to the plane of the folded carton; feeding or advancing the opened carton from one station to a second, filling the carton, folding the end wall closure flaps inwardly, and folding and tucking the tucking closure flaps within the carton, all of which will be more fully set forth in the description of the accompanying drawings, forming a part of this specification, and in the drawings like characters of reference denote corresponding parts throughout the several views, of which:

Figure 1 is an end elevation of the machine viewed from the head or receiving end thereof.

Figure 2 is an end elevation viewed from the opposite end of the machine from that of Fig. 1.

Figure 3 is a side elevation, with a portion of the table shown in section, centrally therethrough.

Figure 4 is a top plan view, with the driving mechanism above the table removed.

Figure 9 is a plan view, of a flat or knockdown carton used in the machine.

Figure 10 is a view similar to Figure 9, showing the flat carton from an opposite side, and the side which is presented upward in its position as fed through the machine.

Figure 5:
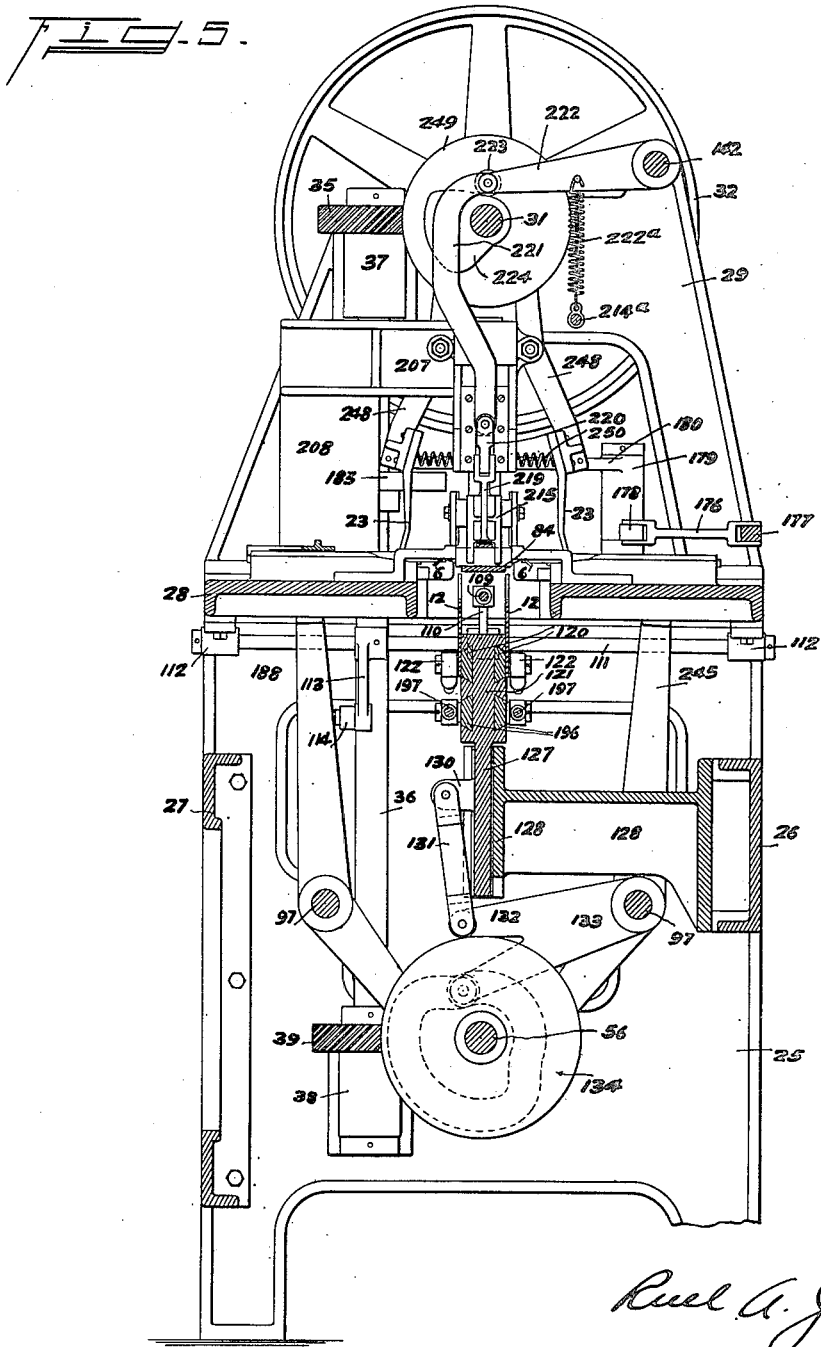
Figure 5 is a section on line 5—5, of Fig. 3.

Figures 11 to 21 inclusive, are enlarged detail views, showing the various steps of operation of squaring the carton, advancing it from one position to a second, inserting the cake of soap, folding the closing flaps inward for packing the soap within the paper carton.

For the purpose of aiding in the understanding of the operation and detail construction of the various parts of the machine, it will be divided, as far as possible, into separate units, segregated and in an order following successively the various steps of operation.

The mechanism is arranged preferably to operate upon a particular kind of cardboard carton presented to the machine in a knockdown or flat form as received from the carton manufacturer and provides a rectangular box with opposite end closure flaps.

While this description will be confined to the particular style of carton shown, the mechanism of the machine is susceptible to operate upon other styles of cartons, likewise the setting of the mechanism is arranged for definite size of carton with adjustments provided for different sizes of cartons, although generally the machine is built and set for a definite kind and size of carton to the preference of the users who delegate the machine for packing one kind of product for its full capacity, and any adjustability of the parts may be chiefly regarded as means for standardizing the machine manufacture to reduce its cost more than as a factor to the benefit of the user in converting its capacity to different kinds and sizes of cartons, although it inherently to a degree may have such extended range.

Carton.

The carton, as shown in Figs. 9 and 10, represents a commercial rectangular cardboard box structure having opposite end closure flaps, and marketed by the box manufacturer in a flat or knock-down form, as shown in said views. These come to the user packed in bundles, uniformly compiled or correspondingly arranged as to their ends and flaps, and ready to be deposited within the magazine of the machine, which is designed to so receive the carton bundles without rearrangement; of advantage to the capacity of the machine and reduction of expense incident to handling.

The carton is made from a single blank of material cut to proper dimension and outline, scored and folded, with its body walls united or joined together.

Preceding a detail description of the machine parts with a general outline of the various manipulative steps following in a sequence in which the box is handled, and for the purpose of identifying the different parts of the box, the construction and operation of the mechanism will be more readily apparent and amplified from the illustration of the various steps or stages.

Referring to Figs. 9 and 10 the carton comprises the opposite face sides 1—2, connected at their opposite ends with the sides or end walls 3—4 respectively. The face side 1 having a pasting flap (not shown) for joining said side with the end wall 3. The face side 2, at its opposite ends respectively, is provided with an end or closure flap 5, having a tucking flap 6. Each end wall or side 3—4, is provided at its opposite ends with a flap 7—7, adapted to be folded inward adjacent the closure flap when the carton is set up.

The cartons are deposited within the magazine in their knockdown or flat condition with the face side 2 upward and with the end walls 4 forward in a direction of the carton advance, or traveling with the carton handling machine, as shown in Fig. 10, with the arrow indicating the direction the carton will travel.

Carton handling, filling and closing.

Figs. 11 to 19 diagrammatically disclose the consecutive steps of handling, filling, and closing the cartons, and with a brief outline as to the method in which the carton is operated upon in advance of a description of the machine parts, their detail of construction and mode of operation will be more fully and easily apprehended.

The cartons are stacked in their knockdown or flat condition within a magazine disposed at the receiving end of the machine, and arranged with their face side 2 upward and with the end wall 4 forward in the direction of travel they follow in their advance through the machine. The lowermost carton of the stack or pile within the magazine is engaged by a pusher or ejector blade, and with the forward stroke of the pusher blade the carton is ejected horizontally from the base of the magazine and advanced over a pair of oppositely disposed guide rails 8 spaced apart from each other to track the tucking flaps 6—6, projecting from the opposite ends of the carton and elevate the tucking flaps and connected end flaps 5—5 of the carton above the plane of the face side 2, as shown in Fig. 11. The tucking flaps therefore are raised to bring their edges above a pair of oppositely disposed carton spreading blades 9—9, moving toward each other transversely to the line of carton travel, to engage between the face sides 1 and 2 of the carton, spreading or separating said face sides from one another preliminary to a squaring operation, which is essential, because it is frequently experienced that the face sides of the carton are stuck together to a degree which would prevent squaring the box. Each blade 9—9 is provided with a straight edge which registers or follows the scored or folding line of the face side 1 and the end wall 3, over which the end wall is folded in squaring the carton or in moving the end walls from their flat horizontal position to a position at right angles to the face walls 1—2.

The blades 9—9, (see Fig. 12), move inward simultaneously at a properly timed interval relative to the advance of the pusher blade or travel of the carton and also serve to properly align the carton centrally between the blades or an abutment carried by the blades arranged to engage the free opposite edges of the face side 2, which will insure a central tracking of the carton through the machine. The carton is advanced by the pusher blade until it engages against a pair of depressible stop levers 10—10, (see Fig. 13), whereupon the advance of the carton is arrested with the forward edge of the end wall 4 engaged against said stop levers 10—10, after which a vertically movable plunger 11, having an upper inclined face, engages against the end wall 3, and the carton being held in its place by the blades 9—9, bearing upon the inside face of the face side 1, which prevents the carton from being bent upwardly off of the table during the upper motion of the plunger 11.

After the plunger 11 has moved to its upper limit, the carton will have been squared and held in its squared position by a vertical face or edge of the plunger 11, until the squared carton has been engaged between the prongs of the pair of carrier members 12—12, moving upwardly from beneath the plane of a table or track and relatively at opposite ends of the carton. The carriers, in a timed movement after the stop levers 10 have been depressed, move forward, advancing the squared carton a predetermined distance until the end wall 4 engages against a second pair of stop levers 13—13, (see Fig. 15), at a filling station in position to receive the cake of soap. The carriers 12—12 then move downwardly and retreat to their normal position for a subsequent operation.

A brace bar 14, mounted above the table, descends and engages against the rear end wall 3 for maintaining the carton in its squared condition during the filling operation. The cakes of soap are conveyed by an endless belt carrier in a direction transverse to the line of carton travel and successively advance upon a vertical movable plunger 14ᵃ, which receives a cake of soap and elevates it from the plane of the carrier, which is slightly below the plane of the table over which the carton travels, to the plane of the table, and arrests the advance of the cakes of soap upon the endless carrier during the ascending period of the soap elevating plunger.

After the cake of soap has been elevated to the table plane, or to a position bringing it into alignment or registration with the inside of the box or carton, it is moved or shoved into the carton by a pusher-bar or member 15 and arrested by a stop member 16, located at the opposite end of the carton.

After the cake of soap has been properly deposited within the carton, the filled carton is again engaged by the carriers 12—12, and between yoke fingers disposed at the forward end of said carriers, for advancing the filled carton from its filling station to its next successive station. The closure flaps 7—7, projecting from opposite sides of the end wall 3, are then moved inwardly, or at right angles to its side or end wall 3, by a pair of wiper members or arms 17—17, (see Fig. 18), which members travel with the filled carton, holding the end flaps 7—7 in their closed or folded position during the travel of the filled carton, while the forward flaps projecting from the opposite sides of the end wall 4, are engaged by the folder members 18—18, located at opposite sides of the carton, bringing or folding the forward end flaps inward or at right angles to their end wall 4, as shown in Fig. 19.

A pair of suitably shaped, horizontally-moving, folding anvils 20—20, moving longitudinally of the table or in the line of carton travel, are then advanced over the folded end flaps 7—7, holding the same in their folded position after the carton has been brought to its end flap tucking station.

At this point, a pair of vertically moving end flap formers 21—21, descend upon the opposite end flaps over the anvils, bringing the end closure flaps 5 downwardly in an inclined position, with their tucking flaps 6 in a vertical position to be bent inwardly toward the body of the carton and in a position to be engaged by the horizontally moving tucking plungers arranged at opposite sides of the carton, moving toward each other, bending or folding the tucking flaps 6 inwardly, as shown in Fig. 21.

These tucking plungers are each provided with a tongue extension adapted to engage between the lower side 1 of the carton and cake of soap, providing a guide for the tucking flap 6, and adapting the same to be pushed inwardly between the lower face or side 1 of the carton and cake of soap, after the anvils 20 have been withdrawn. The end flaps 5 and tucking flaps 6 are then moved inwardly by a pair of swinging fingers or jogging arms 23—23, (see Fig. 21), moving inwardly toward each other, forcing the tucking flaps and end flaps to their closed position, sealing the carton, after which the package may be conveyed from the machine in any suitable manner, or with any suitable mechanism.

The machine consists of a pair of end frames 24—25, suitably connected by cross braces 26—27 and by a table frame 28. A pair of journal brackets 29 and 30 are mounted and secured upon the table, providing a journal and support for the main driving shaft 31, which shaft carries the various cams and transmission devices for operating the movable parts of the machine, arranged and located above the table. The shaft 31 is driven by a pulley 32, fixed to the shaft or connected with the shaft by suitable clutching devices, as may be desirable, but as the means for driving or rotating the shaft 31 does not form a part of this invention, detail illustration or description thereof is herein omitted.

The main driving shaft 31 is provided with a spiral gear 34 in mesh with a spiral gear 35, fixed upon the upper end of a vertical shaft 36. Said shaft, at its upper end, is supported and journaled in a bearing 37, fixed to the journal bearing or bracket 29, and at its opposite end journals within a bearing bracket 38 fixed to the end frame 25.

A second spiral gear 39 is fixed to the vertical shaft 36, adjacent the journal bracket 38, in mesh with a spiral gear fixed upon the horizontal shaft 50, journaled at its opposite ends in the end frames 24—25, below the table. This shaft carries the cams and transmission devices for the mechanism below the table, primarily for imparting vertical reciprocation or motion to such parts.

The horizontal shaft 50 is provided with a second spiral gear 51, fixed upon the end of said shaft 50 in mesh with a spiral gear 52 fixed upon the horizontal shaft 53, disposed at right angles to shaft 50, and journaled at its opposite ends in the brackets 54—54, secured and projecting from the end frame 25. This shaft 53 supports a plurality of cams and transmission devices for reciprocating the various parts of the machine below the table in a direction longitudinal with the table.

*The carton feeding and squaring mechanism.*

A stack of cartons compiled and arranged as previously set forth are deposited within a magazine supported above a table at the receiving end of the machine, said magazine comprising a pair of angle strips 60—60, (see Figs. 3 and 4), which strips are suitably spaced apart to provide rear and side guide walls for the cartons disposed therebetween, and thus provide a skeleton or open-sided magazine, so that free access can be had to the cartons within the magazine.

61 indicates a vertical plate forming the forward side wall of the magazine, which is secured to cross-rails of the front journal bracket 30. This wall is bifurcated or slotted at its lower end and centrally to receive the foot member 62 adjustably secured by set screws 63, respectively engaged through slots in said foot member, and threaded into a cross-rail as a part of the front bearing bracket 30. This foot member is provided with a forwardly projecting toe 64, disposed above the table plane for confining the carton travel beneath the foot upon the table.

The lowermost carton of the pile within the magazine at its rear edge rests upon prongs or a pair of lugs 65—65, projecting from the ejector blade 66, while the forward edge centrally of the carton rests upon the presser or guide foot 67, mounted within a recess in the table frame below the plane of the table. The carton, therefore, has a three-point sustention which is of quite an advantage to consecutive feeding of the cartons singly. The flat or collapsed cartons have a tendency to buckle and not lie perfectly flat upon a plane surface, and as the ejector blade bears a gauged relation to the thickness of the folded or collapsed carton, and considering that if this relation is in any wise disturbed, the ejector will miss advancing the lowermost carton of the pile, or crowd it against the forward wall of the magazine or otherwise interfere with a continuous perfect operation of the machine. this three-point sustention is seen to be advantageous. The prongs or lugs 65 are slightly recessed from the upper plane of the ejector, providing shoulders adapted to engage the edge of the carton directly sustained or resting upon the teats. The sustention of the rear edge of the carton upon two suitably spaced points insures a full bearing contact of the carton at such points, due to the weight upon the carton, whereby the cooperation of the edge of the carton against the shoulders of the ejector is obtained, and whereby but a single carton, the lowermost one of the pile, is ejected from the magazine and advanced over the table with each forward or feeding stroke of the ejector.

The ejector 66 is fixed upon a carriage or slide member 67ª, gibbed upon the way 68, of the bracket 69, fixed to and projecting from the end frame 24, (see Figs. 1 and 3). The slide member or carriage 67ª is reciprocated by a lever 70, the lever 70 at one end being pivotally connected to the carriage and its opposite end fixed upon a rock shaft 71 journaled at its opposite end in a pair of brackets 72, fixed to and projecting from the end frame 24.

The lever 70 intermediate of its length is provided with an ear extension pivotally connecting with a rod 73 extending to the opposite end of the machine and pivotally connecting with the upper end of a lever 74. The lever 74, at its opposite end, is pivotally connected or fulcrumed upon the shaft 75, supported at its opposite ends upon the brackets 54—54 on the end frame 25.

The lever 74, intermediate of its length, has a stud pin projected laterally therefrom, carrying a roller engaged into the cam groove formed in the side face of the cam wheel 76, fixed upon the shaft 53. The cam groove is of an appropriate outline for moving or reciprocating the ejector carriage at a properly timed interval for its forward and retreat strokes, its forward stroke, through its ejector, engaging and advancing the lowermost carton of the pile within the magazine and retreating for a subsequent operation.

The presser-foot 67, centrally supporting the forward end of the carton, and substantially central to the line of travel of the carton over the table, is pivotally mounted upon a bracket member 77, secured within the recess upon the table frame. The rear end of the presser-foot is provided with an adjusting screw 80, for limiting the upward motion of the presser-foot, which is adjusted from the lower face of the toe 64, of the foot member 62, to permit the carton to pass between said members, and offer resistance against the free passage of two cartons simultaneously, thereby preventing the advance of more than one carton at a time.

The presser-foot 67 is yieldingly urged upward by a spring 81 inserted between the presser-foot and the base of the recess within the table. The presser-foot may be adjusted by the adjusting screw 80, for micrometrically setting the presser-foot a determined distance from the guide toe above. The presser-foot will yield downwardly to a degree sufficient to permit the lowermost carton to be advanced between the presser-foot and the guide toe and accommodate for any inequalities in the carton due to its folds, without impeding the advance of the carton. The carton is ejected from the magazine and advanced by the ejector over the table until it engages at its forward end against the depressible stop levers 10—10 respectively arranged at opposite sides of the table or track 84, and their hook or stop ends project upwardly through notches in the side edges of the track 84, to provide a pair of abutments against which the carton is engaged for holding the carton against any advancing motion during the process of squaring the carton.

As the carton in its forward advance leaves the magazine, the tucking flaps 6—6 slide upon and over a pair of oppositely disposed rails 8—8 fixed upon a cross plate 91, (see Fig. 4). These rails have their head planes disposed above the plane of the track 84, for bowing or curving the tucking flaps 6 and side closure flaps 5—5 upwardly, elevating the said flaps to a degree which will bring the free edges of said flaps above the tips or forward ends of the carton wall, at which time the spreading and anvil blades 9—9 are moved toward each other to thread between the superposed sides 1 and 2 of the carton, spreading the said sides. The blades each, are provided with a knife or straight edge 92, aligning with the scored or folding line of the carton, which divides the end wall 3 from the face side or wall 1, and along which the sides fold in squaring or opening the carton. The blades lying directly over the lower side wall 1, operate as a clamp for holding the wall upon the table track 84 and the straight edges of said blades function as anvils over which the end wall 3 is folded in squaring the carton or folding the end wall at right angles to the side or face wall.

The anvil blades are respectively arranged at opposite sides of the track 84, and being of duplicate construction, and the mechanism for reciprocating each blade being similar, each being reciprocated by its own mechanism, a description of one will answer herein.

Figure 8:
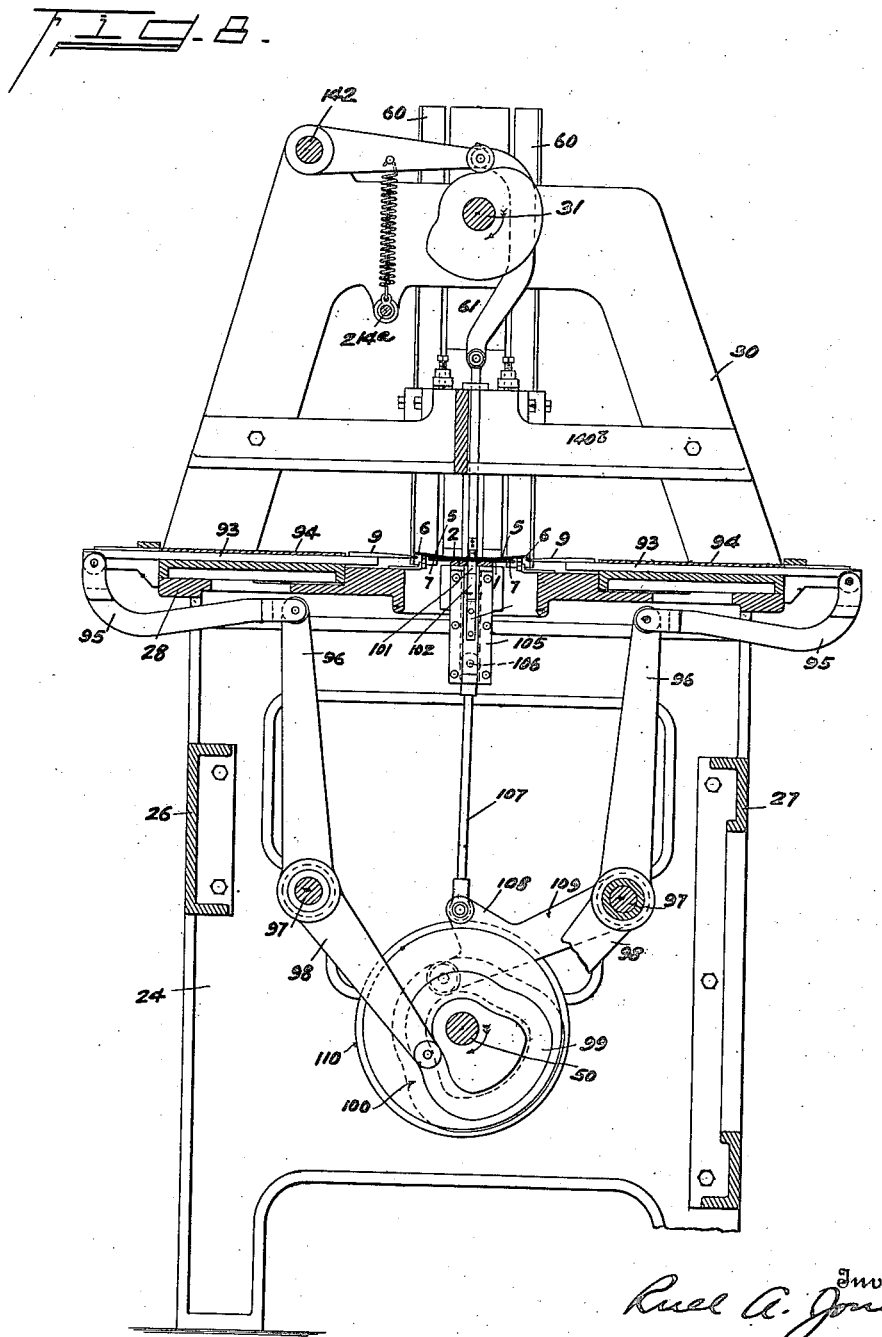
Figure 8 is a section on line 8—8, of Fig. 3.

The blades 9—9 are each fixed upon the end of a slide bar 93, slidably mounted within a way formed in the guide bracket or frame 94, secured upon the table frame, (see Figs. 4 and 8). The outer end of each slide-bar 93 is pivotally connected, through the link 95, to the upper or free end of a lever 96, fulcrumed upon a tie rod 97, secured to and connecting with the end frames 24 and 25. The arm 96 is integral with an arm 98 supported and fulcrumed upon the rod 97, which arm extends downwardly, its free end being provided with a guide roller tracking within the cam groove 99, of a cam 100, fixed upon the horizontal shaft 50. The cam 100, oscillating the connected levers or arms 98 and 96, at an appropriate time and degree, reciprocates the slide-bar 93 and its blade, to move the blade crosswise of the table, permitting the blade to dwell for a predetermined period in its foremost position during the carton squaring operation, and then moving the blade in a retreat direction to its normal position, the cam groove being of appropriate outline to impart the desired motion to the blade in timed coordination with the other moving parts of the machine, so that it will not be necessary to describe in detail the outline of the cam groove.

After the blades 9—9 have been advanced to their forward limit of stroke, and during their dwell interval, the carton-squaring plunger 11 is moved upwardly at the rear end of the carton and below the end wall 3. This plunger 11 is provided with an inclined head 101, which engages the end wall 3 then lying in a flat position upon the track 84, and thereby guides and folds the end wall to a perpendicular position, which action causes the upper face wall 2 to be elevated and moved forwardly, carrying with it the forward end wall 4, moving the same to a perpendicular position, squaring the face and end walls of the carton. The plunger 11 has a perpendicular front face 102, which holds the carton in its squared condition until it is subsequently engaged between a pair of suitably spaced fingers 103—104, the spacing corresponding to the width of the squared carton, projecting upward from each of a pair of carrier plates 12, relatively disposed at opposite sides of the track 84. The plunger 11 is mounted within a way of the vertically disposed guide frame 105, secured to the table frame and depending therefrom, as shown in Figs. 3 and 8. The plunger is provided with a pin 106, projecting laterally therefrom and through an elongated slot in the rear wall of the guide frame 105, which pin pivotally connects with one end of a connecting rod 107. The opposite end of said connecting rod pivotally connects with an arm 108 integral with and projecting from the cam engaging arm 109. The arm 109 is mounted and fulcrumed upon one of the tie rods 97 and is pivoted at its opposite end with a roller engaging into a cam groove of a cam 110, fixed upon the shaft 50 adjacent one of the cams 100 for operating the carton spreading blades 9—9.

The cam, in a revolution, reciprocates the squaring plunger 11 at an appropriate interval after the anvil or spreading blades 9 have been threaded between the face walls of the carton, and the plunger 11 is permitted to dwell for an interval in its uppermost or carton-squaring position, while the anvil blades 9—9 are retreated or retracted, and after the squared carton has been engaged by the carriers 12—12, so that the carton is held or sustained in its squared position ready to be advanced over the table to a next succeeding station for filling the carton.

Before the carton can be advanced from its squaring station to its filling station, it is necessary to depress or withdraw the stop lugs or arms 10, which are projected above the plane of the table 84.

The stop lugs or arms 10, as a pair, are arranged relatively at opposite sides of the track 84, (see Fig. 7), and are fixed upon a rock shaft 105ª, journaled and supported within bracket plates 106ª secured to and depending from the table or track 84. An arm 107 is fixed to the rock shaft 105ª intermediate of the bracket plates 106ª and extends downwardly, and pivotally connects between a pair of links 108, the links extending in a horizontal position forwardly to engage and connect with the stop arms 13, similar to the stop arms 10, and located at an advanced position from said stop arms 10, for arresting and confining the squared box at the carton filling station. The links 108 pivotally connect to one end of a connecting rod 109, the opposite end of said connecting rod being attached to one end of an arm 110, fixed to a rock shaft 111, the rock shaft 111 being journaled and supported at its opposite ends in brackets 112—112, depending and secured to the lower side of the table frame. This rock shaft has a second arm 113 fixed thereon, (see Figs. 3 and 6), and extends downwardly with its free end pivotally connected to one end of a connecting rod 114. The opposite end of the connecting rod 114 is pivotally connected to a lever 115 fulcrumed upon the rod 75 supported within the brackets 54—54. The arm 115 carries a roller having its axis transversely to the arm and engaged into the cam groove formed in one side face of the cam 116, fixed upon the cam carrying shaft.

With each revolution of the cam 116, motion is imparted to the arms and connecting levers connecting with the stop levers 10 for oscillating the same for bringing their stop lugs or fingers above or below the table,—in one position for arresting the travel of the carton, and in the second position to release the carton.

*Carton advancing mechanism.*

The carton is advanced over the table from its squaring station to its filling station and from the filling station to a flap closing or tucking station, after which it is further advanced and discharged from the machine.

Figure 6:
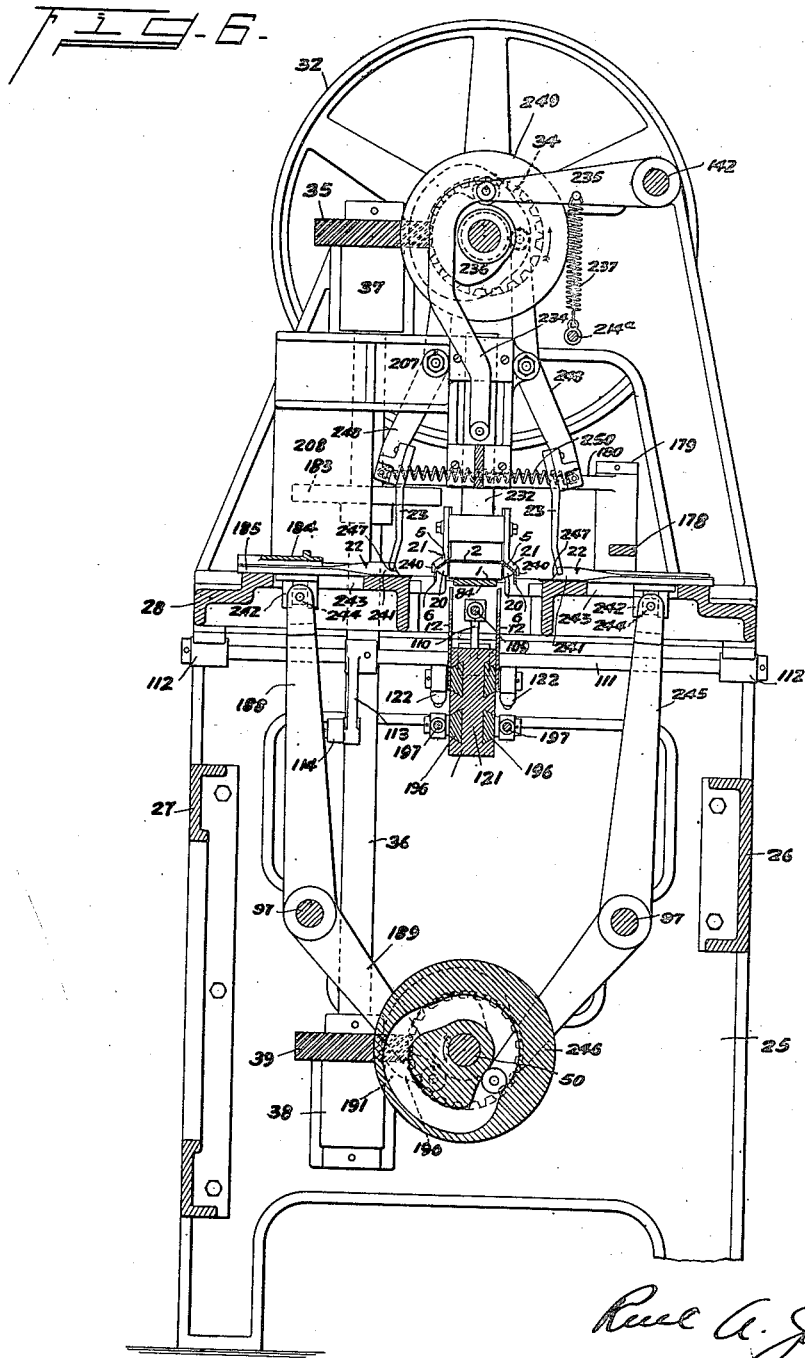
Figure 6 is a section on line 6—6, of Fig. 3.
Figure 7:
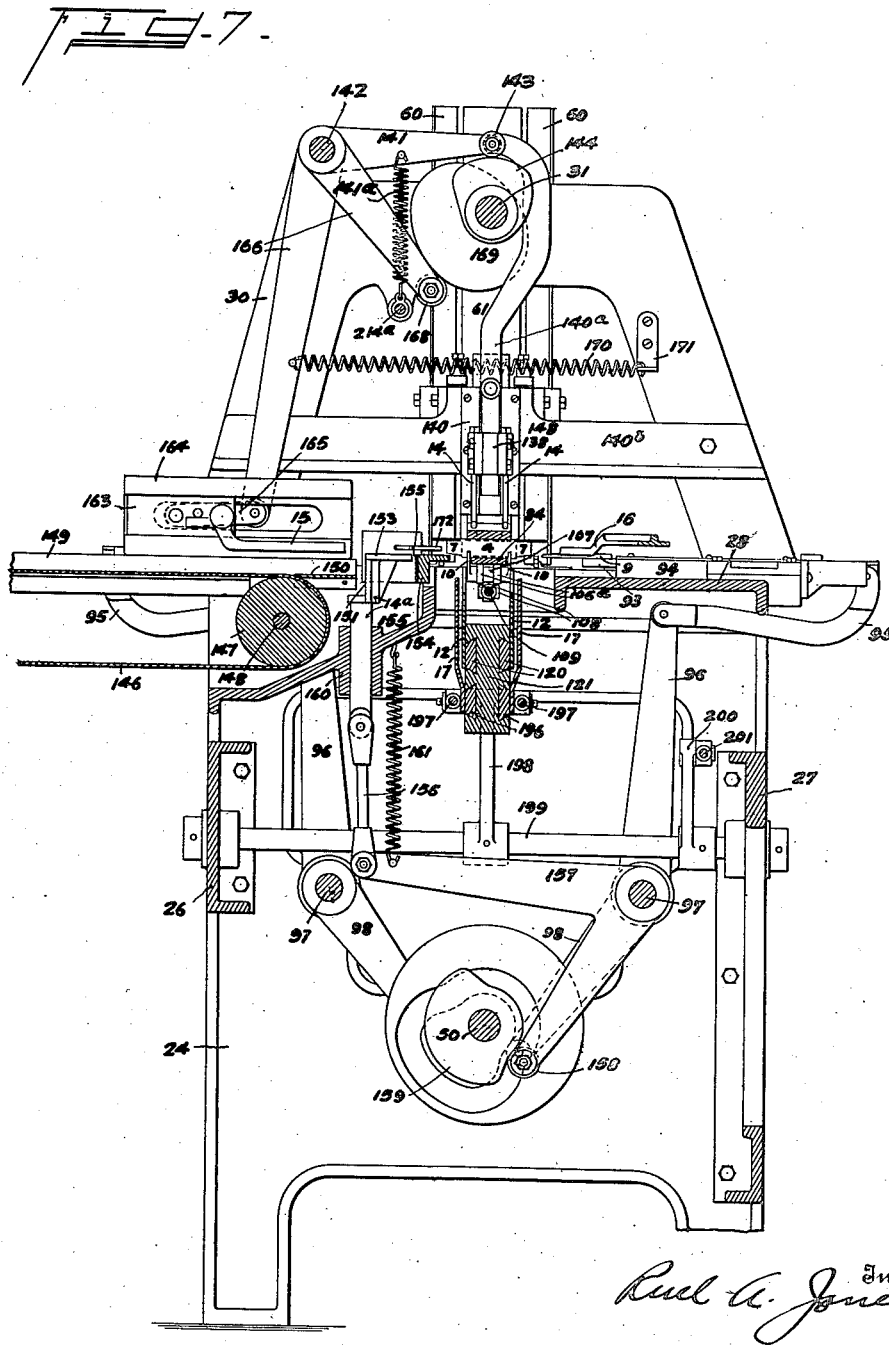
Figure 7 is a section on line 7—7, of Fig. 3.

This mechanism comprises a pair of carrier plates 12—12, relatively arranged at opposite sides of the track 84 (see Figs. 3, 6 and 7). Each plate respectively is secured upon the side of a dove-tail slide member 120—120, the slide members 120 respectively being mounted and sliding each within a way or groove formed in the opposite sides of the guide block 121, sustained below the track 84. Each carrier 12 is pivotally connected to one end of a connecting rod 122 and the opposite end of said rod is connected to the upper end of a lever 122ª fulcrumed upon the rod 75. This lever 122ª, intermediate of its length, supports and carries a roller projecting and engaging into the cam groove of the cam 123 fixed upon the shaft 53, whereby with each revolution of the shaft motion is conveyed to the carriers 12—12, reciprocating the same longitudinally of the track 84, for advancing the cartons from one station to a second upon and over the track. The carriers are each provided with a plurality of vertically projected fingers a definite spacing apart. The fingers 103—104 at the forward end of the carrier are spaced apart a distance approximately corresponding to the width of the squared carton to receive the carton therebetween for advancing or translating the carton in a forward movement of the carriers from its squaring station to the filling station. Each carrier is provided with a second set of fingers 124—125, likewise appropriately spaced apart with the distance of spacing approximately corresponding to the width of the carton for engaging the carton therebetween at its filling station, and for advancing the filled carton to a flap folding and tucking station.

A fifth finger 126 projects vertically from the forward end of each carrier for abuttingly engaging the filled and sealed carton to advance and discharge the filled carton from the machine, or to a point from which it will be conveyed from the machine.

The carriers thus are required to have longitudinal reciprocation and vertical reciprocation, the longitudinal stroke for advancing the carton and the vertical stroke for engaging with the carton and retreating therefrom.

For vertically reciprocating the carriers, the guide block 121 is provided with a depending slide extension 127, gibbed or sliding in the guide head 128 formed on the end of a horizontally projecting bracket 129, fixed to and projecting from the cross-beam 26 of the machine frame. Slide extension 127 is provided with a horizontally projecting ear 130, pivotally engaged or connecting to one forked end of the link 131. The opposite forked end of the link 131 pivotally connects to a limb 132 of the lever 133, fulcrumed upon the tie rod 97. The free end of the lever 133 carries a roller engaged into the cam groove of the cam 134 fixed upon the shaft 50.

After the carton has been squared and before the retreat of the squaring plunger 11, the carriers are moved upwardly, bringing their fingers above the plane of the track 84, engaging the carton between the fingers 103—104, and holding and confining it in its squared condition. The carrier, in its elevated position, is then moved forwardly, carrying the carton with it until the carton is engaged against the fingers of a pair of stop levers 13 projecting above the plane of the track and in advance of the stop levers 10. The stop levers 13 correspond to the stop levers 10 and are connected upon a rock shaft 135 supported within the bracket plates 106, and at an end opposite from the rock shaft 105ª. An arm 136 is fixed to the rock shaft 135, and pivotally connects with the links 108, whereby the stop arms 13 are simultaneously moved or oscillated with the stop arms 10.

At a timed interval after the carton has engaged the second set of stop fingers 13, a pair of brace bars 14 descend adjacent the end wall 3 of the squared carton for holding the carton in its squared condition upon the track during the descent of the carriers 12—12, and during the filling interval. The brace bars 14 are suitably spaced apart and fixed to a bracket 138 mounted upon the slide plate 139, slidably mounted within the guide way of the guide plate or frame 140, fixed to a cross-rail 140ᵇ, extending above the table frame, and fixed to the journal bracket 30. The slide plate 139 and its brace bars or pins 14 are reciprocated vertically at properly timed intervals by the following mechanism.

140ª indicates a link, one end of which is pivotally connected to the slide plate 139. Its opposite end is pivotally connected to the end of an arm 141. The arm 141 is fulcrumed upon a tie rod 142 connecting with the journal brackets 29—30. The arm connecting with the link 140, carries a roller 143 riding upon the periphery of the cam 144, fixed upon the main driving shaft 31. A spring 141ª is attached to the arm 141, and to the rod 214ª to yieldingly press the roller 143 against its cam. Thus, the brace bars or pins 14—14 are reciprocated with each revolution of the cam 144, the cam having a cam surface of appropriate outline to allow for a proper timed dwell of the brace bars or pins 14 at the ends of their strokes.

*Carton filling mechanism.*

The machine is primarily designed for packing bars or cakes of soap, although it is obvious that the carton may be filled with other products.

The cakes of soap are fed to the machine by an endless belt or carrier 146 engaged over a pulley 147, fixed upon a shaft 148 journaled in the side frames of the machine, and may be rotated either continuously or intermittently, as desired, but preferably by means of the mechanism to be hereinafter described, although any driving means may be employed.

The upper run of the belt travels between a pair of guide rails 149, for the purpose of confining the cakes of soap upon the belt in substantial alignment with the open end carton at the filling station. The cakes may be disposed upon the belt or carrier 146, relatively at random in so far as their spacing is concerned, and are delivered by the belt and deposited upon a stationary platform 150 at the advanced end of the forward run of the belt. The belt conveys the cakes to the platform, whereupon the advanced cake is pushed or moved from the platform by the succeeding cakes which are being urged forward by the belt until the advanced cake of the series is pushed against the vertical abutment 151 of the vertically moving plunger or elevator 14ª (see Fig. 7).

When the plunger occupies its upper position, it thus arrests further advance of the cakes until the plunger has descended to bring its head 153 in the plane of the platform 150 so that the advanced cake upon the platform 150 can be pushed forward by the succeeding cakes onto the head of the plunger. The cake, being moved forward upon the head of the plunger until it strikes against the abutment 154, which is provided with a suitable packing or cushion 155 to protect the soap or article against injury by being forcibly moved against said abutment 154. The cake, it being understood, is of sufficient length to completely occupy the full length of the plunger head so as to prevent a second or succeeding cake of soap from being engaged by the head, the head being designed to a dimension for a given size of cake of soap, so that only one cake of soap is operated upon at a time for insertion into the carton.

At a properly timed interval, the cake upon the plunger head is elevated from the plane of the platform 150 to the plane of the track 84, which is disposed at a slightly higher elevation than that of the platform 150. The plunger 14ª, at its lower end, is pivotally connected to one end of a connecting rod 156, the opposite end of the connecting rod being connected to one arm of a bell crank lever 157, fulcrumed upon the tie rod 97 of the side frames. The second arm of the bell crank lever 157 at its free end carries a roller 158, riding upon the periphery of the cam 159, fixed upon the shaft 50.

The plunger 152 is guided within a hub section 160 of the table frame, and 161 indicates a spring with one end fixed to the table frame, and its opposite end connected with the bell crank lever 157 for yieldingly urging the roller 158 of the bell crank lever against the periphery of the cam 159.

After the soap has been elevated from the platform plane to the carton plane, it is pushed into the carton by means of a pusher bar 15, carried by a slide plate 163, mounted within the guide frame 164 for guiding the pusher bar 15 in a horizontal plane transversely to the travel of the carton upon the track 84. The pusher bar and its slide plate are reciprocated by means of a link 165, one end pivotally connected to the slide plate 163, and the opposite end of said link connected to one arm of a bell crank lever 166, fulcrumed upon the tie rod 142, connecting the journal brackets 29—30. The second arm of said bell crank lever 166, at its free end, is provided with a roller 168 engaged against the periphery of the cam 169 fixed upon the shaft 31.

170 indicates a spring, one end connecting to the bell crank lever and its opposite end connected to a bracket 171, fixed to the vertical bracket frame 30. Upon the forward stroke of the pusher bar 15 it will engage the cake of soap and move the cake of soap forwardly between a pair of centering dogs 172 mounted upon a horizontally movable slide member 173, slidably mounted within the guide frame 174 disposed opposite the guide frame 164 for the pusher bar, as shown in Fig. 4. The centering dogs are relatively and oppositely disposed, having their front free ends arched inwardly to serve as guides for directing the soap centrally within the squared carton. These centering dogs are each pivotally mounted and have a rear extension engaged by a spring 175 for yieldingly urging said dogs to maintain their forward free ends inwardly or relatively toward each other. These dogs with their slide plate are moved horizontally to engage the said tucking flaps of the carton and to spread the same open or outwardly as the soap is being pushed into the carton by the pusher bar 15.

The dog carrying slide is reciprocated by means of a link 176, one end pivotally connecting with an ear 177, projecting from said slide member 173. The opposite end of said link connects with an arm 178 fulcrumed upon a vertically extending rod 179, projecting upwardly from the table frame and secured to said frame. A second arm 180 connects with the arm 178, and at its free end carries a roller 181 engaged into the cam groove 182 of the cam 183 fixed to the vertical shaft 36.

To prevent the cake from being pushed through the carton or beyond the ends of the squared sides of the carton, a stop member 16 is provided, at the opposite side of the carton from that of the pusher bar 15, and this stop member 16 is reciprocated at properly timed intervals to move inwardly to said opposite end of the carton. This stop member is mounted upon a slide plate 185 slidingly supported within the slide frame 186, mounted upon the table frame, as shown in Fig. 4. The slide 185 pivotally connects to an arm 188 fulcrumed upon the tie rod 97. A second arm 189 connects with the arm 188 and at its free end carries a roller engaging into the cam groove 190 formed in one side face of the cam 191, fixed upon the shaft 50. The slide 185 and its abutment member 16 operate in a timed relation to the pusher bar 15, and in properly timed relation to the other actuated parts of the machine.

After the carton has been filled, it is then advanced to a flap closing station by the carrier 12 which at a properly timed interval is elevated, engaging the package between the fingers 124—126. A pair of wiping fingers 17—17 are provided, respectively adjacent the carriers 12 at opposite sides of the track 84, each finger being respectively mounted upon a slide 196 gibbed within a way in the guide block 121 carrying the carriers 12—12. The wiping fingers 17—17 therefore are elevated simultaneously with the carriers and the upper free ends of said fingers are normally located at the rear end of the carton for engaging the closure flaps 7—7 projecting from opposite sides of end wall 3 of the carton, to fold said flaps inwardly to their closed position with the forward movement of said finger, traveling forward at an increased rate of speed over that of the carrier during the flap closing interval. Each of the slides 196, respectively has a connecting rod 197 pivotally connected therewith. The opposite ends of the connecting rods 197 are pivotally connected at opposite sides to the upper or free end of a crank arm 198 fixed upon rock shaft 199 (see Figs. 3 and 7) journaled in the frame beams 26—27. The rock shaft has a second crank arm 200 fixed thereon, said crank arm at its free end pivotally connecting to one end of a connecting link 201.

The opposite end of the connecting link 201 pivotally connects to the free end of a lever 202 fulcrumed upon the cross rod 75; the lever carrying a roller engaging with the cam groove formed in one side face of the cam wheel 203 fixed upon the shaft 53.

As the filled carton is advanced or conveyed by the carriers 12—12 from the filling station to the carton closing station, the closure flaps 7—7 projecting from the front end wall 4 of the carton respectively engage the stationary folders 18—18 mounted at opposite sides of the track and tapered so as to receive the flaps and as the filled carton passes between the folders the flaps are pressed inwardly to their closed positions at right angles to the walls to which they connect.

Carton end flap closure mechanism.

The filled carton is advanced or conveyed by the carriers 12—12 from the filling station until its forward end wall 4 is against the vertically movable stop blade 204 disposed vertically above the track 84 (see Figs. 2 and 3). The stop blade 204 is fixed upon the lower end of the vertically reciprocating slide member 205 mounted within a way formed in the guide frame 206 fixed to the cross arm 207 of the bracket 208 fixed to the table frame. The slide member 205 is provided with a stud 209 engaged with one end of the connecting rod 210, the opposite end of said rod 210 pivotally connecting with the free end of an arm 211 fulcrumed upon the connecting tie rod 142 secured to the brackets 25 and 30, upon the table frame. A roller journaled upon the end of the pivot pin connecting the end of the connecting rod 210 with the arm 211, engages upon the periphery of the cam 213 fixed upon the main driving shaft 31. The roller is yieldingly pressed against the periphery of the cam wheel 213 by a spring 214 having one end thereof fixed to the arm 211 and its opposite end fixed to a cross rod 214$^a$ supported by the brackets 29—30. Thus, with each revolution of the cam wheel 213 the stop member is reciprocated to permit the filled and closed carton to be advanced or conveyed from the carton closing station to discharge the package from the machine.

A swinging clamp member 215 is mounted opposite the stop member 204 to engage and clamp the carton between said stop member to hold the same against any advancing movement during the end flap folding and closing operations. The swinging clamp member 215 is pivotally mounted upon the end of an ear or lug 216 depending from the guide frame 217 fixed to the cross arm 207. An arm or ear 218 projects intermediately from the swinging clamp and pivotally connects with one end of the angled connecting link 219. The opposite end of said connecting link is pivotally connected to the slide member 220 slidably mounted in a way formed in the guide member 217.

The connecting rod 221 has one end pivotally connected to the slide member 220 and its opposite end pivotally connects with the free end of an arm 222 fulcrumed upon the tie rod 142. A roller 223 journals upon the pivot pin connecting the connecting link or rod 221 and arm 222, and engages or rides upon the periphery of a cam 224 fixed to the main driving shaft 31, a spring 222$^a$ being provided to hold the arm 222 in engagement with its cam. Thus, with each revolution of the cam wheel 224 the slide 220 is reciprocated for swinging the clamp from its normal position shown in Fig. 3 upwardly above the height of a carton conveyed upon the track 84 from the filling station to the carton flap closing station.

After the carton has been brought to its end flap closing station a pair of anvils 20—20 approximately triangular in cross-section, disposed relatively at opposite sides of the track and filled carton, are moved adjacent the opposite open ends of the carton outside of the folded end wall closure flaps 7—7, over which the end closure walls are folded for tucking, and adapt the closure or tucking flap to a position from which it can be inserted into the carton. The anvils are the duplicates of each other, and each is secured respectively upon the end of a slide rod 226, slidably mounted within a guide frame or way recessed into the top of the table frame, and confined therein by plates 226$^a$ secured to the table frame. The opposite end of said slide rod 226 pivotally connects through the medium of a link 227$^a$ with one end of an arm 227, the opposite end of the arm being fixed upon a rock shaft 228 journaled in the bracket extensions 54—54. One of said arms 227 is provided with an arm extension 229 extending downwardly from the rock shaft 228 with its free end provided with a roller engaging into the cam groove formed in one face of the cam wheel 230 fixed upon the cross shaft 53. Thus, with each revolution of the cam wheel 230 the anvils are reciprocated horizontally for moving the anvils adjacent the opposite open ends of the filled carton. Each of the anvils 20, being of approximately triangular shape in cross section, is arranged to provide a perpendicular face adjacent the end wall closure flaps 7—7, and an inclined face over which the end closure wall or flap is folded with the apex or intersecting joint of the perpendicular and angular walls, aligning with the scored line dividing the upper face side 2 and end wall or closure flap 5 of the carton. The third side of the anvil joining the perpendicular and angular sides is preferably curved from the perpendicular wall upwardly for guiding the tucking flap 6 inwardly and downwardly as it is being pushed to its closed position within the carton.

The end closure walls 5—5 of the carton, and their respective flaps 6 extend substantially in a horizontal plane so that the anvils 20—20, as they are moved rearwardly, are slid below the end walls 5 to adapt the walls to be folded upon or over the anvils. The end walls are pressed downwardly over the anvils by a pair of pressing or folder members 21, oppositely disposed and respectively cooperating with the anvils 20. These pressing or forming members are secured upon the slide member 232 reciprocating vertically in a slide-way formed in the cross arm 207. The slide 232 connects with a connecting link 234, said connecting link, at its upper end, being pivotally connected to the free end of an arm 235 fulcrumed upon the tie rod 142. A roller is mounted upon the pivot pin connecting said link 234 and arm 235, riding upon the periphery of a cam wheel 236 fixed upon the main driving shaft 31 (see Fig. 6). The roller is yieldingly pressed or engaged against the periphery of the cam by a spring 237 having one end thereof connected or fixed to the arm 235, the other end being fixed to the connecting rod 214ª, extending between the frames 25 and 30 fixed upon the table. Thus, with each revolution of the cam wheel 236 the pressing and folding members are reciprocated at properly timed intervals, elevating and lowering said members for cooperation with the anvils. Each pressing and folding member 21 is provided with a depending lip 240 for engaging the tucking flap 6 to fold or bend the same over the anvil to a vertical position, as shown in Figs. 6 and 20, to condition the same to be tucked and forced or pushed inwardly into the carton.

After the tucking flaps have been folded downwardly to approximately a vertical position, they are engaged respectively by a pair of tucking blades or tongues 241 extending from the tucking plungers 22. As the tucking plungers 22, arranged at relatively opposite sides, are the duplicates of each other, a detailed description will be confined to the singular number.

The tucking plunger or slide 22 is mounted within a guideway formed in the upper surface of the table frame, one side representing the guide 186 which carries the stop arm 16, whereby the stop arm 16 and its tucking plunger move as a unit. The plunger 22 on its lower face is provided with a fork 242 projecting through an oblong slot 243 in the table frame. The slide block 244 is engaged between the prongs of said fork and pivotally connects to the upper end of one arm of a lever 245, said lever being fulcrumed upon a tie rod 97 with the second arm of said lever 245 provided with a roller engaging into the cam groove of a cam wheel 246 fixed upon the shaft 50.

In a forward stroke of the plunger 22 its tongue extension 241 engages the depending tucking flap 7 of the carton, bending or folding the tucking flap over the base side of the anvil, directing the tucking flap toward the body of the carton in a position to be pushed inwardly between the lower face wall of the carton and cake of soap within the carton. The tongue is moved inwardly beyond the anvil and into the carton between the lower face wall of the carton and cake of soap to provide a guide blade for the tucking flap and insure its being inserted properly within the carton, and between the lower face wall of the carton and the cake of soap. The plunger 22 comes to rest at the limit of its forward stroke for an interval, during which time the anvils are withdrawn from within the partially folded end wall and tucking flaps, leaving said flaps in the position shown in Fig. 21, and held in such position by the upturned curved edge walls 247 of the plunger 22, preventing the tucking flaps from springing upwardly, and holding the same in a proper position to be forced inwardly to their closed position. With the tucking flaps folded to a position as shown in Fig. 21, they are then engaged respectively by swinging arms 23—23, arranged relatively at opposite sides of the carton or track 84. Each swinging arm respectively is fixed upon the end of a lever 248 fulcrumed upon the cross arm 207 and extends upwardly, the free end of the lever being provided with a roller engaging into the cam groove of a cam wheel 249 fixed upon the main driving shaft 31. A spring 250 being connected to the finger carrying levers 248 to retract the same. These fingers 23—23, or jogging arms, in each revolution of their respective cams 249 are moved toward each other for engaging the partially folded flaps of the carton to insert and force the flaps inwardly to their closed position with the tucking flap at right angles to the end wall closure flaps, tucked between the lower face wall of the carton and cake of soap within the carton.

After the carton flaps have been properly closed, at a properly timed interval the fingers 126 of the carriers 12 when elevated engage the filled and closed carton, conveying and advancing the filled carton with the forward stroke of the carriers to the discharge end of the machine, from which they may be advanced upon a suitable conveyer or withdrawn for packing.

As the cartons are ejected from the magazine, and translated forwardly toward the stops 10, they move beneath a presser-foot 300 extended forwardly and centrally of the track, designed to hold the carton in its collapsed condition until its edge engages against the stops. This avoids any possible buckling of the cartons as they are translated, for if the forward edge of the cartons were permitted to flex upwardly, it might be passed over the ends of the stops instead of abuttingly engaging therewith. The presser foot 300 is mounted upon the end of a slide rod 301 extending vertically through an opening in the cross-rail 140ᵇ, and its upper end pivotally connects with a link 302. The link 302 carries a roller engaging upon the periphery of the cam 303, fixed upon the shaft 31. The presser foot normally is free to be moved upwardly with the opening of the carton and under such condition is non-influenced by the cam. The cam is provided with a notch which at a proper point in the cam cycle would permit the roller on the end of the link 302 to engage therein, provided no open carton is disposed beneath the presser foot. In such event the presser foot would serve as a part of tripping mechanism for throwing a clutch controlling the main driving pulley 32. As this automatic power controlling mechanism is auxiliary to the mechanism for folding and filling the carton, and subject matter for a separate invention, the present specification is not encumbered with a more specific description thereof.

The shaft 148 for driving the pulley 147 and soap conveyor belt 146 is intermittently rotated by the transmission means shown in Fig. 1. A worm gear 310 is fixed to the shaft 50 in mesh with a worm gear 311 on the end of the shaft 312. The shaft 312 extends upwardly at an angle and is journaled in the brackets 313 and 314 on the machine frame 24. A worm gear 315 is fixed on the opposite end of the shaft 312 in mesh with a worm gear 316 on a shaft 317 for rotating the cooperating Geneva gear members 318—319, converting constant rotary into intermittent rotary motion, the Geneva gear member 319 driving a gear 320 in mesh with a gear 321 on the shaft 148.

Having described the invention, I claim:

1. The combination with a track over which collapsed cartons are advanced, a stop member projecting above the plane of the track to arrest the advance of the carton, a plunger movable transversely to the plane of the track for engaging the carton at an end opposite from said stop member and squaring or opening the collapsed carton, and confining the squared carton between the stop member and said plunger.

2. In a machine of the character disclosed for opening a collapsed carton having scored lines to determine the lines along which said carton will bend in opening, a means for supporting the collapsed carton, a pair of opposing blade members for entering said carton from opposite ends along one of said scored lines, and holding the carton upon its supporting means, and means movable transversely to the flat carton having an inclined surface for engaging a side wall of the carton beyond said blade member for opening the carton by bending the engaged side wall about said blade member on said scored line.

3. The combination of a means for supporting a collapsed flat carton, blades entering the carton from opposite ends along a scored line of a carton over which an extended portion of the carton is bent at the scored line for opening the carton, said blades each provided with means adapted to engage the carton for centering the carton intermediate of said means.

4. The combination of means for supporting a collapsed flat carton, an abutment above the plane of the support for arresting the movement of the carton upon said support, means entering the carton for separating the walls thereof and retaining the carton upon the support, and a plunger movable transversely to the plane of the support engaging the underside of the carton adjacent said carton wall separating means for squaring the carton in a forward direction of plunger movement.

5. The combination of means for supporting a collapsed flat carton, the carton having opposite open ends, an abutment extendng above the support for engaging a fold edge of the flat carton, means opposingly engaged into the opposite ends of said flat carton for separating the overlying walls thereof and retaining the carton upon said support, and transversely movable means engaging the carton at a fold edge opposite said abutment for squaring said carton, and two contiguous walls of the carton abut said means engaged into the carton.

6. The combination of a support for a collapsed flat carton, the carton having opposite open ends, an abutment projecting above the plane of the support for engaging one of the fold wall edges of the flat carton and confining the carton against movement upon said support, means for engaging into the carton for initially separating the overlying walls of the carton and retain the carton upon said support, and a plunger movable transversely to the plane of the flat carton, having an inclined head surface for engaging an end of said flat carton opposite said abutment for squaring the carton in a direction toward said abutment.

7. In a machine for closing the end flap and its connecting tucking flap of a carton, a reciprocating anvil over which the end and tucking flaps are folded, means movable transversely to the anvil for engaging the end flap upon the anvil in a partially closed position and bending the tucking flap at an angle thereto, and means for engaging the free end of the tucking flap and moving to fold the same over the anvil in a direction of flap insertion into the carton.

8. In a machine of the class described for closing a carton end tucking flap, a triangular anvil disposed adjacent the carton open end, a plunger movable to cooperate with the anvil for partially folding the carton flap about the anvil, and a flap folding member movable transversely to said plunger and cooperating with said anvil for completing the folding of the flap about said anvil.

9. In a machine of the class described for closing a carton end closing tucking flap, an anvil disposed adjacent the carton open end, over which the carton tucking flap is folded for closing and relatively transversely movable members successively cooperating with said anvil for folding the flap about said anvil.

10. In a machine for closing and tucking end flaps of a carton, a reciprocating anvil movable across the open end of the carton and adapting the carton flap to be folded about the anvil with the free end of the flap directed toward the carton end opening, a guide adapted to be moved into the open end of the carton for guiding the free end of the carton flap into the carton, and means for engaging said folded flap and moving the same into its carton closing position.

11. In a carton-closing machine, a reciprocating anvil over which the end closure flap of the carton is folded to direct its free edge into the carton, a guide plate entering the carton for folding the flap edge over the anvil and guiding it into the carton, and means for closing said flap subsequent to its folding.

12. In a carton-closing means, oppositely disposed guide and blade members for entering the opposite open ends of a carton therebetween for folding and guiding the tucking closure end flaps of the carton into the carton, and means for closing and tucking in said end flap over said blade member.

13. In a machine of the class described for closing a carton end closing tucking flap, a triangular anvil disposed with one side in plane and adjacent the open end of the carton, a first flap folder member cooperating with a face of said anvil, partially folding the flap about the anvil, and a second flap folder member movable transversely to said first flap folder member and cooperating with a second face of said anvil, for completely folding the flap about said anvil and guide the free end of the flap toward the carton open end.

14. In a machine of the class described for closing a carton end closing tucking flap, a triangular anvil disposed across the open end of the carton, first and second relatively transversely movable flap folder members, successively cooperating with said anvil for folding the flap about said anvil for closing, with the free end of the flap directed inwardly toward the open end of the carton, said second member having a blade extension reaching into the carton for guiding the tucking end of the flap for insertion into the carton.

15. In a machine of the class described for closing a carton end closing tucking flap, a reciprocating triangular anvil. adapted to be disposed across the open end of the carton, first and second relatively transversely movable flap folder members successively cooperating with said anvil for folding the flap about said anvil, with the free end of the flap directed inwardly toward the open end of the carton for insertion into the carton, and a movable pusher member, engaging said folded flap after the retreat of said anvil and first folder members, for moving the flap to its closed position and its tucking end into the carton.

In witness whereof, I hereunto subscribe my name, as attested by the two subscribing witnesses.

RUEL A. JONES.

Witnesses:
L. A. BECK,
J. C. JUNIUS.